Nov. 3, 1964 W. ROTH ETAL 3,155,883

TEMPERATURE-REGULATED TRANSDUCER

Filed Feb. 20, 1961

INVENTORS
WILFRED ROTH
EDWARD W. BEAL
BY
ATTORNEYS

United States Patent Office 3,155,883
Patented Nov. 3, 1964

3,155,883
TEMPERATURE-REGULATED TRANSDUCER
Wilfred Roth, 58 Brainard Road, West Hartford, Conn., and Edward W. Beal, Wethersfield, Conn.; said Beal assignor to said Roth
Filed Feb. 20, 1961, Ser. No. 90,272
7 Claims. (Cl. 317—132)

This invention relates to a temperature-regulated electro-mechanical transducer.

Electro-mechanical transducers having a magnet structure to produce a magnetic field in a gap therein, and a coil movable in the gap, are often called "moving-coil" transducers. The magnet structure may be of the electromagnet or permanent magnet type, the latter being more common at the present time. If the coil is mechanically moved in the magnetic field, a voltage will be generated therein and a corresponding current produced in a circuit connected thereto. Vice versa, if an electric current is caused to flow through the coil, the coil will be mechanically displaced.

In some applications it is required that the transducer respond very accurately to an applied force. In such applications it has been found that variations in the strength of the magnetic field due to the temperature changes limit the desired response accuracy. Temperature effects on the moving coil may also be significant in some applications. Such temperature changes may result from changes in room temperature, varying temperature of parts of the apparatus with which the transducer is associated, etc. Enclosing the complete apparatus, including the transducer, in a thermostat-controlled oven is often impractical due to size limitations, amount of power required, adverse effects on overall operation, etc.

It is a primary object of the present invention to provide a temperature-regulated transducer of the moving-coil type which maintains the temperature of the magnet structure constant to a considerable degree of accuracy, and to accomplish this with a relatively simple, compact arrangement.

The invention will be described in connection with a specific embodiment thereof in which.

Figure 1:
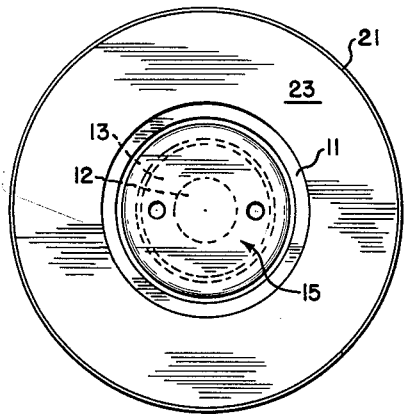
FIG. 1 is a front view of the transducer.
Figure 2:
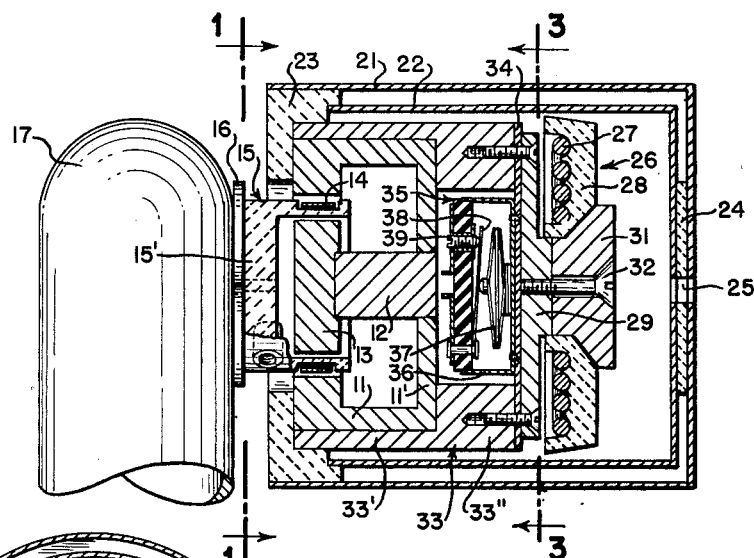
FIG. 2 is an axial cross-section of the transducer with the moving coil attached to a pipe whose movement is to be sensed.

Referring to the drawings, a magnet structure is shown of generally closed cylindrical configuration. It comprises a cylindrical outer core section 11 joined through section 11' thereof to a central pole 12 of permanent magnet material. A pole-piece 13 is mounted on the front of the permanent magnet pole 12 to define an annular gap between the pole-piece and the adjacent front portion of section 11. A coil 14 is wound on a coil form 15 and is arranged for movement within the annular gap.

As specifically shown, the coil form is attached to a mounting pad 16 which in turn is effixed to a pipe 17 whose movement is to be sensed. Pipe 17 is pivoted at a point (not shown) sufficiently remote so that the coil 14 moves approximately axially in the annular gap. For other applications, the coil can be mounted for movement in the gap in any desired manner.

The magnet structure is located at the forward end of a housing comprising thermal shield cans 21 and 22. An annular member 23 of heat insulating material closes the space between the shield cans at the front ends thereof, and extends over the front of the magnet core 11. The thermal shield cans are mounted in spaced relation by a disk 24 of heat insulating material between the closed rear ends thereof. A small aperture 25 is provided for leads to the heater.

A heater element 26 is provided having a spiral heater coil 27 mounted in a ceramic base 28. The heater element is attached to a mounting bracket 29 extending transversely of the housing. To this end, an insert 31 is bonded to the heater base 28 and attached to bracket 29 by a bolt 32.

A tubular member 33, of good heat conductivity, has a relatively thin-walled forward section 33' encircling the magnet structure in close contact therewith. Toward the rear of the tubular member is a thicker wall section 33". A thin plate or diaphragm 34 is mounted across the rear of the thick-walled portion of member 33. A thermostat 35 is mounted within the tubular member in contact with diaphragm 34. The thermostat is of a type adapted to sense the temperature of the diaphragm.

The thermostat 35 here shown is of a commercially available type having an expandable outer casing 36 and a low expansion metal bridge 37. As the outer case expands and contracts, the bridge causes movement of a leaf spring 38 so that it alternately makes and breaks contact with an adjustable screw 39. Suitable terminals are connected to the leaf spring 38 and adjusting screw 39, respectively, for connection to an external circuit.

Figure 4:
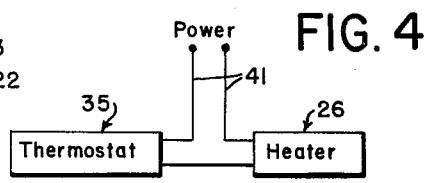
FIG. 4 is a circuit diagram of the thermostat and heater arrangement.

As shown in FIG. 4, the thermostat 35 is connected in series with heater 26 and supplied with power from a suitable source through line 41. The interconnections may be made internally, and lines 41 passed through aperture 25. These are not shown, to avoid confusion in the drawings.

In order to bring the transducer up to temperature rapidly from a cold start, and to maintain a uniform temperature thereafter, the operating temperature of the heater is substantially higher than the temperature at which it is desired to maintain the magnet structure. For example, in one embodiment the heater operates in the region of 1300–1450° F., and the thermostat operates at about 290° F.

The diaphragm 34 is advantageously of good heat conductivity and sufficiently thin so that it has very little thermal inertia. Accordingly the temperature of the diaphragm which the thermostat senses in very nearly the temperature at the rear end of the thick wall 33" of the tubular member to which it is attached. The diaphragm also prevents direct exposure of the thermostat to the high temperature of the heater element.

Figure 3:
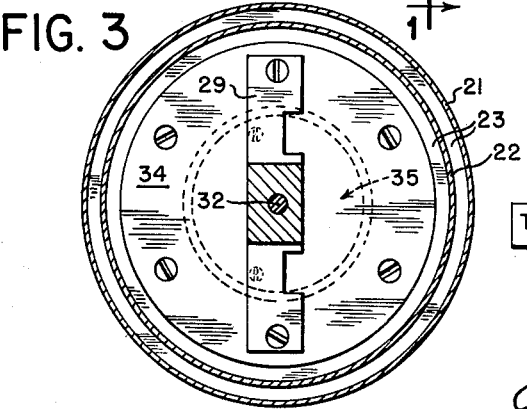
FIG. 3 is a cross-section along the line 3—3 of FIG. 2.

With diaphragm 34 sufficiently thin to have low thermal inertia, it may still have adequate strength to support the relatively light thermostat 35. However, it may not be able to support the heavier heater element 26. Thus, mounting bracket 29 supports the heater element, but is advantageously narrow and cut away, as illustrated in FIG. 3, so as not to obstruct the flow of heat to the diaphragm and tubular member 33 more than is necessary for adequate strength.

The bulk of the radiation from the heater coil 27 is received directly by the thick end of the tubular member 33, since it is positioned generally thereover. The thick walled portion 33″ serves as a heat reservoir to reduce the temperature ripple in the magnet structure due to the "on-off" cycling of the heater. Heat is conducted from the thick wall section 33″ to the abutting rear portion of the magnet, and also through the thin-walled section 33′ to the cylindrical wall of the magnet. The thin-walled section 33′ has lower thermal inertia than the thick-wall section so that an even temperature is applied to the magnet structure. Thus the tubular member 33 acts as a thermal filter, and may appropriately be termed a thermal filter body.

Upon initial starting up from a relatively cold condition, the high temperature of the heater will bring the temperature of the adjacent thick-wall end of the thermal filter body and diaphragm 34 to the temperature at which the thermostat is set, whereupon the heater circuit will be broken. Heat will flow through the thermal filter body to the magnet structure, thereby reducing the temperature of diaphragm 34 and causing the thermostat to reclose. Cycling will continue with decreasing "on" times until a stable operating condition is reached. Thereafter, the heater will be turned on and off, as required.

Some temperature ripple will be present at the thermostat. In part this is due to the temperature differential between 'off' and "on" of the thermostat, and in part due to overshoot and undershoot because of the thermal inertia of the heater. This temperature ripple at the thermostat will be substantially the same as that at the rear end of the thick-walled section 33″, since diaphragm 34 has low thermal inertia. However, since the thick-walled section has a considerable heat storage capacity, the temperature ripple at the magnet structure will be considerably less. Thus, the thermal filter body 33 acts much like an electrical filter in an A.-C. power supply, and serves to maintain the magnet structure at the desired uniform temperature.

The thermal sheild provided by the space between cans 21 and 22 serve to promote a uniform magnet temperature, and also avoids unnecessary heat loss.

In order to prevent unnecessary heat loss through the annular gap between pole piece 13 and the core 11, and thereby promote a uniform magnet temperature, the coil form 15 is advantageously of heat-insulating material and arranged to substantially fill the gap, while at the same time allowing free movement of the coil. The end of the coil form away from the gap is advantageously closed, as shown at 15′, by a relatively thick-walled section so as to reduce heat loss from the face of the pole-piece 13 and also to insulate the coil from varying temperatures in the pipe 17, or other member to which it may be attached. The annular member 23 advantageously extends over the face of the magnet structure for the same purpose.

As an example, certain specific dimensions and materials may be given which have been found suitable for a particular application. It will be understood that these are for illustration only, and that the invention is not limited thereto.

For this particular application, diaphragm 34, thermal filter body 33, the thermal shield cans 21, 22 and the bracket 29 were of aluminum. The outside diameter of the thermal filter body 33 was 2½ inches, the wall thickness of section 33″ was ½ inch and that of section 33′ was approximately 0.15 inch. The length of section 33′ was about 1 3/16 inches and that of 33″ about 9/16 inch. The thickness of diaphragm 34 was approximately 0.02 inch.

The cylindrical configuration of the embodiment shown in the drawings facilitates machining and assembly, and the axial symmetry is advantageous in obtaining effective temperature regulation. However, it will be understood that other configurations may be employed if desired.

Suitable mounting means for the housing of the transducer may be provided as suits the intended use. In general, it is desirable to avoid mounting structures which are likely to conduct heat to the housing, and heat-insulating material may be employed to this end.

The invention has been described in connection with a specific embodiment thereof. However, it will be understood that modifications may be made by those skilled in the art within the spirit and scope of the invention.

We claim:

1. A temperature-regulated electro-mechanical transducer which comprises a housing, a magnet structure in said housing having a gap therein, a coil movable in said gap, a heater in said housing spaced from the magnetic structure, a heat-conducting plate in said housing extending transversely across the space between said heater and magnet structure in the path of heat flow therebetween, a tubular heat-conducting member extending between said plate and said magnet structure, and a thermostat for controlling said heater, said thermostat being positioned adjacent said plate for sensing the temperature thereof.

2. A temperature-regulated electro-mechanical transducer which comprises a thermal shield housing, a magnet structure in said housing having a gap therein, a coil movable in said gap, a heater in said housing spaced from the magnetic structure, a heat-conducting plate in said housing extending transversely across the space between said heater and magnet structure in the path of heat flow therebetween, a tubular heat-conducting member extending between the peripheral region of said plate and said magnet structure and encircling said magnet structure in closely adjacent relationship, and a thermostat for controlling said heater, said thermostat being positioned adjacent said plate for sensing the temperature thereof.

3. A temperature-regulated electro-mechanical transducer which comprises a thermal shield housing, a magnet structure in said housing having a gap therein, a coil movable in said gap, a heater in said housing spaced from the magnetic structure, a thin heat-conducting plate in said housing extending transversely across the space between said heater and magnet structure in the path of heat flow therebetween, a tubular heat-conducting member extending between the peripheral region of said plate and said magnet structure and encircling said magnet structure in closely adjacent relationship, the wall thickness of said tubular member being substantially greater in the portion thereof between said plate and magnet structure than in the portion thereof encircling the magnet structure, and a thermostat for controlling said heater, said thermostat being positioned adjacent said plate for sensing the temperature thereof.

4. A temperature-regulated electro-mechanical transducer which comprises a tubular thermal shield housing having the rear end thereof substantially closed, a magnet structure including an annular outer section and a central pole section with an annular gap around the pole section at the front end thereof, said magnet structure being mounted in said housing toward the front end thereof, a coil movable in said annular gap, an electric heater mounted in said housing toward the rear thereof, a thin diaphragm of heat-conducting material mounted in said housing between said heater and magnet structure, said diaphragm extending transversely of the housing and being spaced from the magnet structure, a tubular heat-conducting member extending between the peripheral region of said diaphragm and said magnet structure and encircling the outer section of the magnet structure in contact therewith, the wall thickness of said tubular member being substantially greater in the portion therof between said diaphragm and magnet structure than in the portion thereof encircling the magnet structure, and a thermostat mounted inside said tubular member for controlling said heater, said thermostat being mounted in contact with said diaphragm on the side thereof toward the magnet structure and adapted to sense the temperature of the diaphragm.

5. A temperature-regulated electro-mechanical transducer in accordance with claim 4 including an annular heat-insulating member mounted at the front end of said housing and extending over the front end of the magnet structure toward said annular gap.

6. A temperature-regulated electro-mechanical transducer in accordance with claim 4 in which said coil is mounted on a coil form of heat-insulating material and the portion of the coil form in said gap fills a major portion of the gap.

7. A temperature-regulated transducer in accordance with claim 6 in which the end of the coil form away from the gap is closed by heat-insulating material.

References Cited in the file of this patent
UNITED STATES PATENTS
2,706,229   Buske _____ Apr. 12, 1955